Patented Jan. 13, 1942

2,269,464

UNITED STATES PATENT OFFICE 2,269,464

METHOD OF MOLDING CASEIN PRODUCTS

Christopher Luckhaupt, Jamaica, N. Y.

No Drawing. Application June 25, 1938,
Serial No. 215,855

1 Claim. (Cl. 18—48)

My present invention relates to an improved method of molding casein products.

Pursuant to my invention, casein in substantially dry status is intermixed with ammonium acetate in substantially dry status, preferably as crystals of ammonium acetate. The proportion of ammonium acetate to casein may be varied from 5% to 50% by weight.

The casein ingredient may be, and preferably is, in dry powder form.

Usually the casein product is desired of particular configuration, for which purpose a suitable mold is employed for imparting the desired configuration. In carrying out my process to derive a molded casein product, the stated intermixture is placed in the mold, and heat applied thereto, whereupon the intermixture is rendered plastic, the casein and ammonium acetate ingredients dissolving in one another, accompanied by chemical reaction, give rise to the liberation of ammonia, evolution of steam and other moisture, and the attainment of a substantially homogeneous casein product.

Such molding process is carried out in a mold suitable for imparting the desired configuration, and at the same time affording the escape of steam, ammonia, and other evolved gases, and for the attainment of the latter purposes, the mold may comprise component parts provided with extremely fine bore apertures, or one or more passages provided with snifter i. e., gas escaping, valves, or the component parts of the mold may be intermittently separated, or equivalent procedure.

The product thus derived contains a minimal amount of acetate residue.

To impart durability, and in particular immunity against water, atmospheric effects, alcohol, oils and the like, the molded casein product may be treated with formaldehyde as by immersion in a bath of formaldehyde or in a bath of aqueous or other solution of formaldehyde, or by subjection to vapors of formaldehyde, or equivalent.

If desired, substances such as fillers of the nature of wood flour, diatomaceous earth, or the like, and/or extenders such as clays, silicas, and the like, in range of proportion of from 5 to 25% by weight, may be employed.

A color may be imparted by adding suitable pigment, and/or in the form of metallic powder such as bronze powder, and the like. If preferred, the color may be imparted to the casein product by supplying the color in the form of a dye, such as an analin dye, added to a bath of aqueous solution of formaldehyde. Such color is imparted to the product in suitable quantity to attain the desired tone, as is well understood by those skilled in the art.

Casein products made pursuant to my invention embodying pigment and/or metallic powder and/or filler, and/or extender, as aforesaid, are opaque. Casein products formed pursuant to my invention without the addition of pigment or metallic powder or filler and/or extender, as aforesaid, are substantially transparent. Casein products formed pursuant to my invention without the addition of pigment or metallic powder or filler and/or extender, but treated with analin or equivalent dye, are translucent.

When it is desired to impart further desirable qualities to molded casein products, such as freedom from brittleness, or greater flexural tensile and compressional strength, or freedom from oxidation, I may add a fatty acid radical, such as ammonium stearate, calcium or copper stearate, or the like, in proportion usually from approximately 1% to approximately 5% by weight.

My casein product as aforesaid can be made in sheet form, or in tubular form and possesses the attributes of capability of being sawed or pierced by nails, screws or the like, or may be drilled, planed or otherwise machined, or may be sanded, buffed, polished or the like.

Pigments and/or metallic powder, may be interposed in the aforesaid casein intermixture to give striae, either parallel or otherwise, or in symmetrical or in marbelized relationship in the resultant product.

Mother-of-pearl effect is had by adding to the aforesaid casein-ammonium salt dry mixture nacre, either in the form of fish scales or synthetic.

An iridescent "mother-of-pearl" effect is obtained by including oxy-bismuth chloride in powder form with nacre, as aforesaid, and added to the aforesaid casein intermixture.

I claim:

The method of molding casein products which comprises intermixing casein in substantially dry status with ammonium acetate in substantially dry status in the proportion ranging from five per cent (5%) to fifty per cent (50%) by weight of ammonium acetate, subjecting such intermixture to elevated temperature to effect interaction of the ingredients, permitting the escape of ammonia and other gases, and molding the resulting heated plastic mass while permitting escape of ammonia and other gases.

CHRISTOPHER LUCKHAUPT.